United States Patent
Snodgrass

(10) Patent No.: US 7,844,304 B1
(45) Date of Patent: Nov. 30, 2010

(54) METHOD OF FILTERING LOW FREQUENCY COMPONENTS FROM POWER LINES

(75) Inventor: Timothy E. Snodgrass, Palo, IA (US)

(73) Assignee: Rockwell Collins, Inc., Cedar Rapids, IA (US)

(\*) Notice: Subject to any disclaimer, the term of this patent is extended or adjusted under 35 U.S.C. 154(b) by 875 days.

(21) Appl. No.: 11/260,850

(22) Filed: Oct. 27, 2005

(51) Int. Cl.
*H04M 1/00* (2006.01)

(52) U.S. Cl. .................... 455/572; 455/127.1; 455/574; 363/15; 363/21.01

(58) Field of Classification Search ............... 455/299, 455/424, 425, 456.5, 456.6, 561, 550.1, 575.1, 455/63.1, 67.11, 570, 572, 114.1, 295, 283, 455/286, 287, 296; 363/44, 21.01, 21.09, 363/21.12, 21.17, 131, 15–20; 323/282, 323/272, 235, 280, 281, 284, 286, 266, 274; 327/552–555
See application file for complete search history.

(56) References Cited

U.S. PATENT DOCUMENTS

| | | | | |
|---|---|---|---|---|
| 3,745,442 | A | * | 7/1973 | Gynn .................... 322/24 |
| 3,908,159 | A | * | 9/1975 | Griffey .................... 363/54 |
| 5,194,726 | A | * | 3/1993 | Jonkman ............. 250/214 VT |
| 5,615,129 | A | * | 3/1997 | Stich et al. ............... 700/297 |
| 5,619,079 | A | * | 4/1997 | Wiggins et al. ............... 307/89 |
| 5,731,731 | A | * | 3/1998 | Wilcox et al. ............... 327/403 |
| 6,381,155 | B1 | * | 4/2002 | Kadatsky et al. ............. 363/65 |
| 7,061,778 | B2 | * | 6/2006 | Odell et al. ............. 363/21.01 |
| 7,332,900 | B2 | * | 2/2008 | Currell ...................... 323/285 |
| 2002/0093319 | A1 | * | 7/2002 | Ball ........................ 323/282 |
| 2004/0012988 | A1 | * | 1/2004 | Kranister et al. ........... 363/112 |
| 2004/0062058 | A1 | * | 4/2004 | Hann et al. .................. 363/15 |
| 2004/0155640 | A1 | * | 8/2004 | Sutardja et al. ............ 323/283 |
| 2005/0002211 | A1 | * | 1/2005 | Lee et al. ...................... 363/44 |
| 2006/0041770 | A1 | * | 2/2006 | Lougee ....................... 713/340 |
| 2006/0164048 | A1 | * | 7/2006 | Muterspaugh ............. 323/235 |
| 2007/0042729 | A1 | * | 2/2007 | Baaman et al. .......... 455/127.1 |

\* cited by examiner

*Primary Examiner*—Duc Nguyen
*Assistant Examiner*—Charles Chow
(74) *Attorney, Agent, or Firm*—Matthew J. Evans; Daniel M. Barbieri

(57) ABSTRACT

A power supply for a communications device, including a controllable regulator that varies power drawn from a power input according to communications requirements of the communications device. The controllable regulator increases power drawn from the power input immediately before an increase of power is required by the communications device when a magnitude of a rate of change of required power exceeds a predetermined level. An active filter is connected to an output of the controllable regulator. The active filter is controlled to variably divert power that is output from the controllable regulator in excess of what is required by the communications device, wherein electromagnetic emissions resulting from the rate of change of power are reduced.

20 Claims, 4 Drawing Sheets

METHOD OF FILTERING LOW FREQUENCY COMPONENTS FROM POWER LINES

FIELD OF THE INVENTION

The invention relates to electronic circuitry, and more particularly, to the reduction of low frequency components from such circuitry.

BACKGROUND OF THE INVENTION

Through normal operations, many electronic components generate electromagnetic emissions that may interfere with other electronic components. Small, passive components such as capacitors, inductors, and ferrites can be used to filter out high-frequency electromagnetic emissions. However, there are situations in which very low-frequency electromagnetic emissions must be eliminated or minimized. For example, radio circuitry in some aircraft platforms are required to be analyzed for electromagnetic emissions all the way down to the audio range of frequencies. This can be problematic when dealing with bursty transmissions and with amplitude modulation (AM) strategies because of the great variation in demand for power. FIG. 1 shows a square radio signal pulse. The power requirement to transmit such a pulse instantaneously increases and decreases at times t1 and t2, respectively, which results in unacceptable electromagnetic emissions in the power supply. If an attempt is made to smooth the pulse beginning at time t1 to reduce the very low frequency electromagnetic emissions of the power supply (as shown in FIG. 2), it is possible that the radio pulse will be unrecognized by a distant receiver awaiting a predefined waveform.

FIG. 3 depicts a known type of very low frequency filter 2 connected to an output of a power supply unit 4. Very low frequency filter 2 relies upon massive energy storage, using very large capacitors 6a and 6b, inductors 8, and other components, to form a very low frequency filter that filters out the bursty power demands of AM transmission. The weight of such inductor- and capacitor-based filters can exceed the weight of the circuitry to be filtered by a factor of two. For airborne solutions or in other applications where weight is at a premium, the increased weight is simply untenable.

It is therefore an object of the invention to filter very low frequency electromagnetic emissions from a power supply.

It is another object of the invention to provide a lightweight, very low frequency filter for a power supply.

A feature of the invention is increasing and decreasing power drawn from a radio power supply input when not required for transmission, while at the same time diverting power in excess of what is required to an actively controlled filter.

An advantage of the invention is that sudden or instantaneous changes in power demand can be smoothed out, thereby substantially reducing or eliminating very low frequency electromagnetic emissions.

SUMMARY OF THE INVENTION

The invention provides a power supply for a communications device. The power supply includes a controllable regulator that varies power drawn from a power input according to communications requirements of the communications device. The controllable regulator increases power drawn from the power input immediately before an increase of power is required by the communications device when a magnitude of a rate of change of required power exceeds a predetermined level. An active filter is connected to an output of the controllable regulator. The active filter is controlled to variably divert power that is output from the controllable regulator in excess of what is required by the communications device, wherein electromagnetic emissions resulting from the rate of change of power are reduced.

The invention also provides a power supply for a radio. The radio employs a waveform characterized by requiring high rates of change of power to fulfill transmission requirements. The radio is further characterized by a predetermined knowledge of when an increase of power will be required to fulfill the transmission requirements. The power supply includes a controllable regulator connected to a power supply input and to a power supply output. The controllable regulator increases the power requested from the power supply input before a beginning of a required increase of power to fulfill transmission requirements. The controllable regulator decreases the power requested from the power supply input after an end of the required increase of power. An active filter is interposed between the controllable regulator and the power supply output. The active filter is controlled to have any power in excess of current output power requirements diverted thereto.

The invention further provides a method of filtering very low frequency electromagnetic emissions from a radio power supply. According to the method, it is determined when a change in a power level will be required by the radio. When the required power is to be increased, power drawn by the power supply is increased prior to the required power level change. When the required power is to be decreased, power drawn by the power supply is decreased after the required power level change. Any power drawn by the power supply in excess of what is required by the radio is diverted to a gated shunt regulator so that the radio is supplied only the required power level.

DETAILED DESCRIPTION OF THE DRAWINGS

Figure 1:
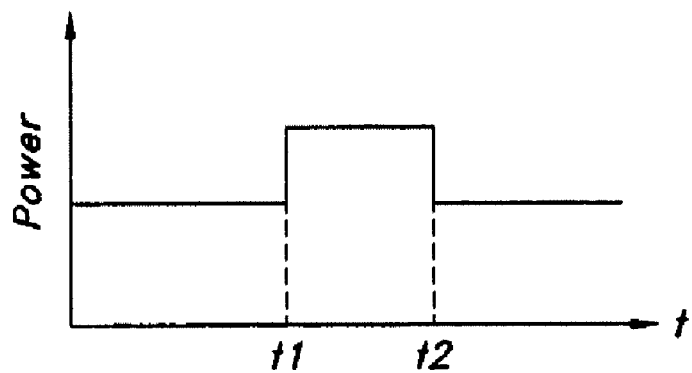
FIG. 1 is a graph showing part of a radio signal.
Figure 2:
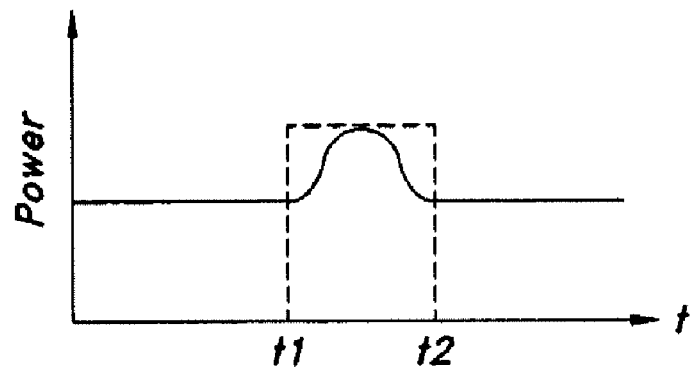
FIG. 2 is a graph showing part of another radio signal.
Figure 3:
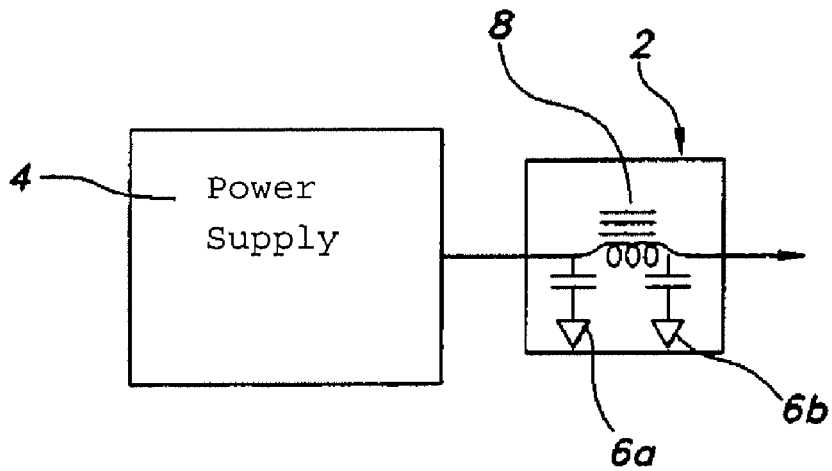
FIG. 3 is a schematic diagram showing a power amplifier and a known very low frequency filter.
Figure 4:
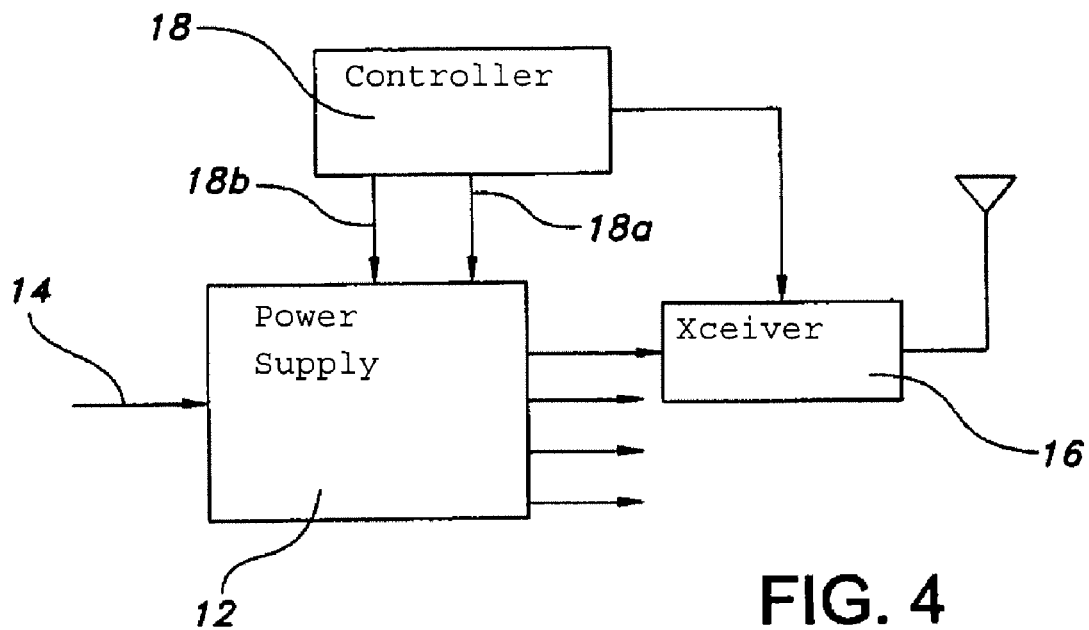
FIG. 4 is a schematic diagram of a radio system usable with the invention.
Figure 5:
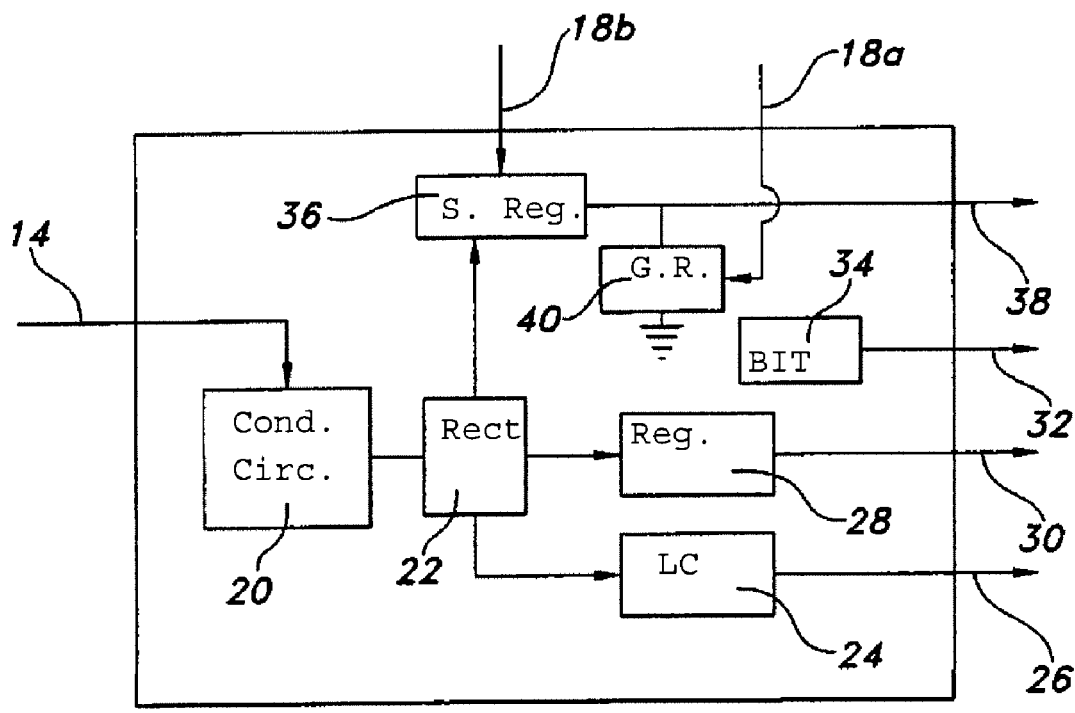
FIG. 5 is a schematic diagram of a power supply unit according to the invention.

Describing now the invention with reference to FIGS. 4-5, the invention provides a lightweight method of filtering very low electromagnetic emissions from a power line in a radio system 10. It should be noted that the drawings are not necessarily drawn to scale, and that the dimensions of the various disclosed components have been drawn for the purposes of clarity in understanding the invention. Radio system 10 includes a power supply 12 that accepts, for example, 115 VAC 400 Hz 3-phase power at an input 14. Power supply 12 supplies power through a plurality of outputs to multiple components within the radio system, including transceiver circuitry 16. A controller 18 controls the transmission of radio signals by the transceiver circuitry. According to the invention, controller 18 also provides control signals 18a and 18b to power supply 12, as will be explained further. Radio system 10 is presented in a simplified form, it being understood that other components may be present as well.

Power supply 12 is shown in more detail in FIG. 5. Power entering through input 14 passes through conditioning circuitry 20 and to rectifier circuitry 22 that converts the input alternating current to direct current (DC). A simple passive filter, such as an LC filter 24, is connected to rectifier circuitry 22 and provides unmodulated alternating current to an output 26. A first series of regulators 28 ensure constant DC current is sent through output 30. A fault signal output 32, which alerts to a fault or interruption in power, can be generated by a power supply Built-in Test (BIT) module 34 within the power supply. Rectifier circuitry 22 also provides power to a series regulator 36 that is configured to provide a high voltage output at 38. Series regulator 36 is controlled by control signal 18b. The power output at 38 provides the power used to generate the radio signals. An active filter, such as a gated shunt regulator 40, is connected to the output of series regulator 36. Gated shunt regulator 40 is designed to variably shunt or divert power from output 38 according to control signal 18a received from controller 18.

Figure 6:
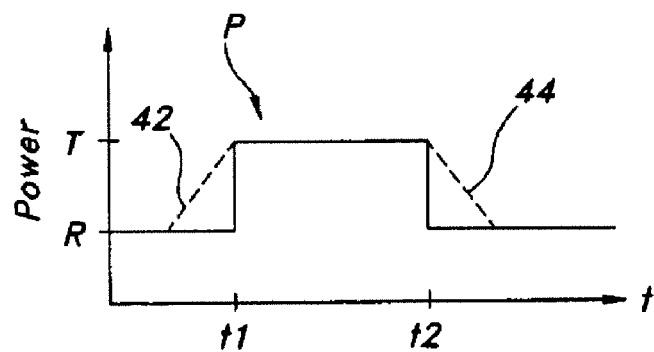
FIG. 6 is a graph showing part of a radio signal according to the invention.

The invention takes advantage of a feature of current radio designs, such as a multi-channel software-defined radio or the like, in which the waveform is predetermined and the precise time when signals are transmitted according to the waveform is also predetermined. In such cases the radio system knows in advance when power is required to be drawn by output 38 to generate a radio signal. Such advance knowledge of when power is required to be drawn can be used to intelligently prepare the power supply before a high power demand occurs. FIG. 6 is a graph of power supplied over output 38 according to the invention. A transmit pulse P alternates from a receive power level R and a transmit power level T. When it is known that a transmit pulse P is about to begin at time t1, controller 18 sends control signals 18b to series regulator 36 so that, prior to time t1, the power output therefrom begins to gradually increase. Because the transmit pulse P has not yet begun, however, the increased power is not sent through output 38, but is instead directed to gated shunt regulator 40 where the power is dissipated in the form of heat. The amount of power sent to gated shunt regulator 40 is controlled by the controller using control signal 18a so that any power in excess of what is immediately required is diverted to the gated shunt regulator. As the time for the transmit pulse gets nearer, power output from series regulator 36 increases, while the power sent to gated shunt regulator 40 likewise increases. The increase in power, as graphically expressed by dashed line 42 in FIG. 6, is calculated to be substantially equal to the power required by transmit pulse P when the transmit pulse is set to begin. When the transmit pulse begins, power is no longer diverted to gated shunt regulator 40, but is instead sent through output 38 to form the transmit pulse. At the end of the transmit pulse, the gated shunt regulator is again directed to divert any power in excess of the receive power level R. At the same time, the power output by the series regulator is controlled to be gradually reduced, as indicated by dashed line 44, until the receive power level R is once again achieved. Once the receive power level is reached, no power is diverted to the gated shunt regulator. The area between transmit pulse P and dashed lines 42 and 44 represents power diverted into gated shunt regulator 40, which is wasted or dissipated as heat using fins or other passive resistor means attached or connected to the gated shunt regulator. Preferably such passive resistors are positioned outside the radio enclosure to minimize the effect of heat dissipation on the radio components.

The effect of the invention is that from the perspective of the output 38, the power supply provides a stepped or instantaneous increase in power sufficient to properly form a transmit pulse. From the perspective of the input 14 of the power supply, however, the required power is steadily increased by series regulator 36, thereby eliminating the instantaneous increase in power demand due to transmit pulses. Such elimination of the instantaneous power demand also eliminates or substantially reduces the resulting very low frequency electromagnetic emissions.

Figure 7:
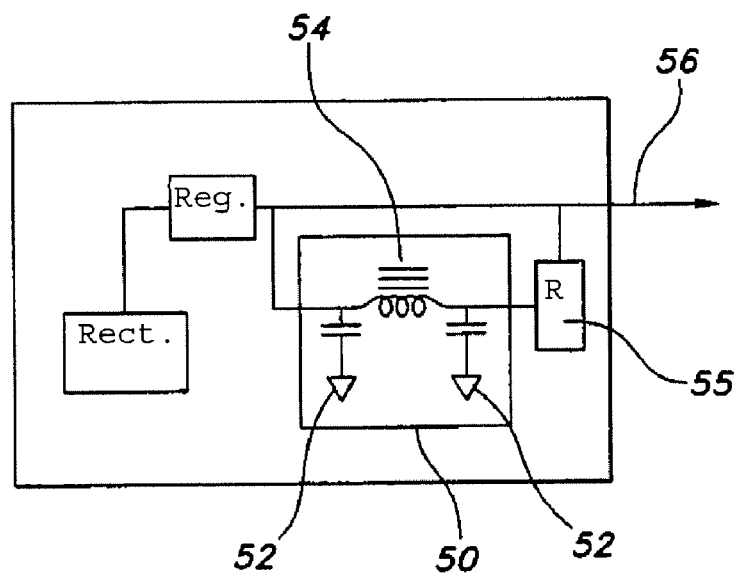
FIG. 7 is a schematic diagram of a power supply unit according to another embodiment of the invention.

The passive resistor element or elements of the gated shunt regulator as described above replace heavy energy storage components and are advantageously used in environments where weight is a primary design consideration, such as in light aircraft or small vehicles. If weight is not a primary design concern, the gated shunt regulator may be varied as shown in FIG. 7 to include energy storage components such as capacitors 52, inductors 54, or the like. Such an energy-storing gated shunt regulator 50, when used with a radio where the power demands are known in advance, can be controlled to redirect the stored energy to the power source output 56 via a circuit 55, thereby reducing the waste of energy by the shunt regulator 50. Regardless of whether the gated shunt regulator dissipates or stored energy diverted thereto, the concept of controlling output power based upon known future energy requirements is the same.

Figure 8:
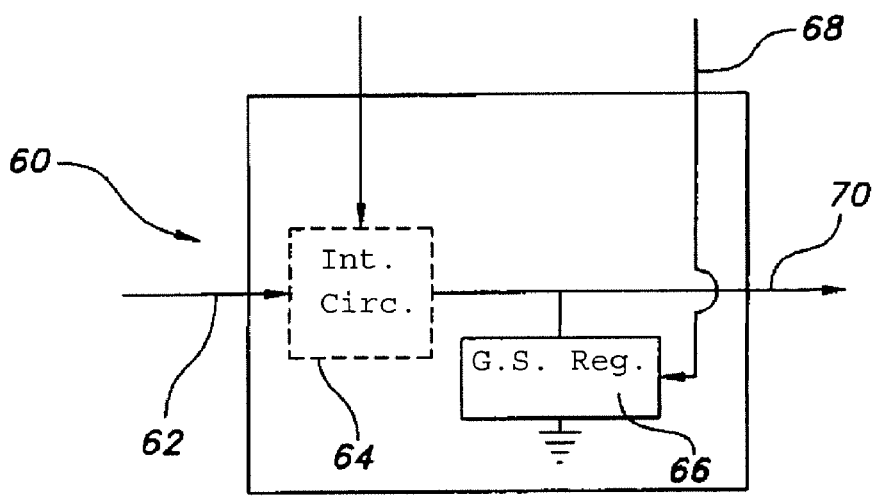
FIG. 8 is a schematic diagram of a power supply unit according to still another embodiment of the invention.
Figure 9:
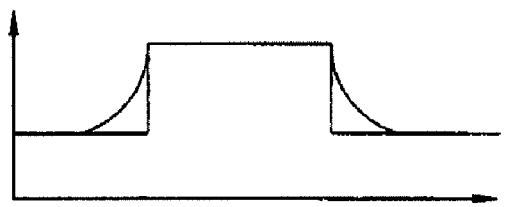
FIG. 9 is a graph showing a part of a radio signal according to an embodiment of the invention.
Figure 10:
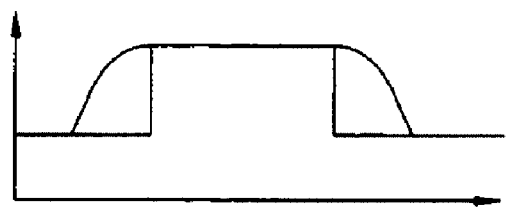
FIG. 10 is a graph showing part of a radio signal according to another embodiment of the invention.
Figure 11:
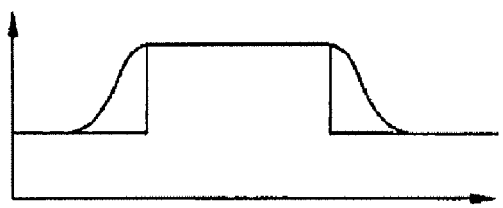
FIG. 11 is a graph showing part of a radio signal according to still another embodiment of the invention.
Figure 12:
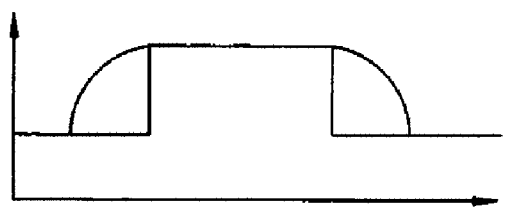
FIG. 12 is a graph showing part of a radio signal according to yet another embodiment of the invention.
Figure 13:
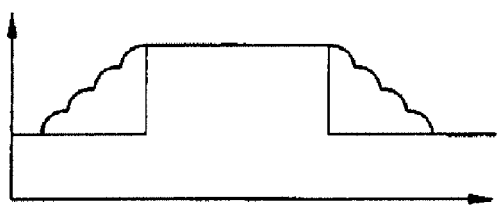
FIG. 13 is a graph showing part of a radio signal according to still another embodiment of the invention.

The power supply shown in FIG. 5 is representative of power supplies used in communications systems. However, the invention may be used with other power supplies having greater or fewer components. A simplified power supply 60 is shown in FIG. 8, in which input power 62 is sent through one or more groups of internal circuitry 64, depicted schematically and symbolically as a dashed box. The internal circuitry includes means for variably increasing and decreasing power demand, such as a series regulator. A gated shunt regulator 66, controlled through a control signal 68, is positioned to selectively divert a gradually increasing amount of power until the increased power is substantially equal to that required by a power output 70 at the beginning of a transmit pulse or other required instantaneous power demand. The gated shunt regulator is likewise controlled to selectively divert a decreasing amount of power until the decreased power is substantially equal to a non-transmitting power level.

Figure 14:
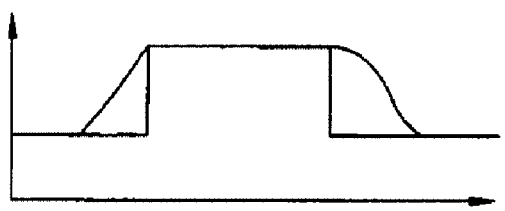
FIG. 14 is a graph showing part of a radio signal according to yet another embodiment of the invention.

The invention may be varied in many ways while maintaining the spirit of the invention. For example, the increase and decrease of power is shown in FIG. 6 as being linear, as represented by lines 42 and 44. Other schemes may be used as desired. For example, FIGS. 9, 10, 11, 12 and 13 express exponential, sinusoidal, Gaussian, logarithmic, and irregular power variations, respectively, all of which are within the scope of the invention. Also, different schemes may be used for increasing the power and decreasing the power. FIG. 14 shows a power pulse with a linear pre-pulse power increase and a Gaussian post-pulse power decrease. Other schemes and combinations are possible and are within the scope of the invention. The invention may further be varied by increasing or decreasing to a predetermined length the duration of pre- and post-pulse pulse increases or decreases in power as may be applicable for a particular application or waveform. Lastly, the rate, duration, and scheme (e.g., linear, sinusoidal, etc) of power diversion to and from the gated shunt regulator may be varied depending upon the environment or geographical region in which the radio is operating.

Figure 15:
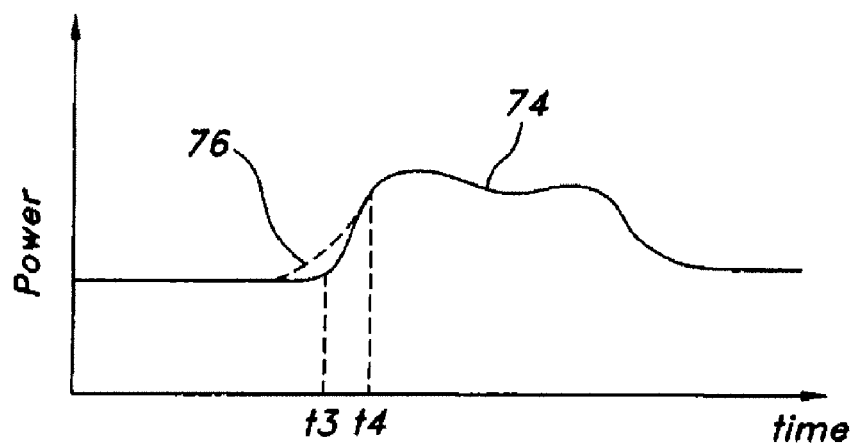
FIG. 15 is a graph showing part of a radio signal according to another embodiment of the invention.

The invention has been described as being applicable to a radio requiring instantaneous increases in power demand to support transmitting of messages. However, other types of signals may be advantageously filtered by the disclosed controllable gated shunt regulator, provided changes in power requirements are known in advance. FIG. 15 depicts a frequency waveform with intermittent power requirements, where the required power level at any moment is represented by the line 74. The rate of change of the required power is represented by the slope of line 74. If, as shown between times t3 and t4, the magnitude of the rate of change of required power, exceeds a predetermined level, some of the power is diverted into the gated shunt regulator and is either dissipated or stored as desired. Instead of seeing a high rate of change of required power, the power supply sees a smoothing or a lower rate of change of required power, which is graphically expressed by line 76. The difference between lines 74 and 76 represents the power diverted to the gated shunt regulator. As before, the lower rate of change of required power results in reduced very low frequency electromagnetic emissions.

The invention as described herein provides a controllable power supply that diverts power from its output prior to and after instantaneous power demands. An advantage of the invention is that very low frequency electromagnetic emissions are substantially reduced.

Another advantage is that because energy-storing electrical components are not required, the filtering of very low frequency electromagnetic emissions may be accomplished by much lighter passive resistor schemes. The resulting substantial reduction in weight and size of the filter structure makes such electromagnetic filtering feasible where weight and volume are premium design concerns.

Still another advantage of the invention is that the invention may be used with any type of power signal, whether pulsed or non-pulsed, where the rate of change of required power exceeds permissible and/or predetermined levels.

Yet another advantage is that because the amount of power diverted to the gated shunt regulator is controlled by a controller, the rate, duration, and scheme of power diversion by the gated shunt regulator can be varied as desired.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A power supply for a communications device, comprising:
   a controllable regulator that varies power drawn from a power input according to communications requirements of the communications device, the controllable regulator increasing power drawn from the power input immediately before an increase of power is required by the communications device when a magnitude of a first rate of change of required power exceeds a predetermined level in response to a first control signal from a controller, wherein the controllable regulator is configured to gradually increase the power drawn from the power input after receipt of the first signal from the controller such that a second rate of change of power drawn from the power input in response to the first control signal is lower than the first rate of change of power required by the communications device; and
   an active filter, connected to an output of the controllable regulator, the active filter controlled to variably divert power that is output from the controllable regulator in excess of what is required by the communications device in response to a second control signal from the controller, wherein electromagnetic emissions resulting from the rate of change of power are reduced, wherein the active filter comprises power storage components that store power diverted to the active filter, wherein the active filter is controlled to release stored power to the power supply output to assist in fulfilling transmission requirements of the radio.

2. The power supply of claim 1, wherein the active filter includes a passive resistor element that dissipates power diverted to the active filter.

3. The power supply of claim 1, wherein the controllable regulator is configured and controlled to decrease power drawn from the power input immediately after a decrease of power is required by the communications device when the magnitude of a third rate of change of required power exceeds the predetermined level, wherein the controllable regulator is configured to gradually decrease the power drawn from the power input such that a fourth rate of change of power drawn from the power input in response to the decrease in power required by the communications device is lower than the third rate of change of power required by the communications device.

4. A power supply for a radio, the radio using a waveform characterized by requiring high rates of change of power to fulfill transmission requirements, the radio further characterized by a predetermined knowledge of when an increase of power will be required to fulfill the transmission requirements, the power supply comprising:
   a controllable regulator connected to a controller, to a power supply input and to a power supply output, the controllable regulator responsive to a first control signal from the controller increasing the power requested from the power supply input before a beginning of a required increase of power to fulfill transmission requirements, wherein a first rate of change of power is required to fulfill the transmission requirements, wherein the controllable regulator is configured to gradually increase the power requested from the power supply input in response to the required increase in power such that a second rate of change of power requested from the power supply input in response to the required increase in power is lower than the first rate of change of power required to fulfill the transmission requirements, the controllable regulator decreasing the power requested from the power supply input after an end of the required increase of power, wherein the controllable regulator is configured to gradually decrease the power requested from the power supply input after the end of the required increase in power such that a third rate of change of power requested from the power supply input in response to the end of the required increase in power is lower than a fourth rate of change of power required by the radio based on the end of the required increase in power; and an active filter, coupled to the power supply output and coupled to the controller and responsive to a second control signal from the controller, the active filter controlled to have any power in excess of current output power requirements diverted thereto, wherein the active filter comprises power storage components that store power diverted to the active filter, wherein the active filter is controlled to release stored power to the power supply output to assist in fulfilling transmission requirements of the radio.

5. The power supply of claim 4, wherein the active filter comprises at least one passive resistor component to dissipate power diverted thereto.

6. The power supply of claim 4, wherein the power storage component are indicators or capacitators.

7. The power supply of claim 4, wherein the active filter comprises a gated shunt regulator.

8. The power supply of claim 4, wherein the controllable regulator is configured to linearly increase power requested from the power supply input before the beginning of a required increase of power to fulfill transmission requirements, and further wherein the active filter is configured to linearly increase the amount of power diverted thereto in response to such linear increase of requested power by the controllable regulator.

9. The power supply of claim 4, wherein the controllable regulator is configured to non-linearly increase power requested from the power supply input before the beginning of a required increase of power to fulfill transmission requirements, and further wherein the active filter is configured to non-linearly increase the amount of power diverted thereto in response to such linear increase of requested power by the controllable regulator.

10. The power supply of claim 9, wherein the non-linear increase of power requested from the power supply input and the non-linear increase of the amount of power diverted to the active filter is characterized by a sinusoidal response.

11. The power supply of claim 9, wherein the non-linear increase of power requested from the power supply input and the non-linear increase of the amount of power diverted to the active filter is characterized by a Gaussian response.

12. The power supply of claim 4, wherein the power supply input provides power having an alternating current to the power supply, the power supply further comprising rectifying circuitry that converts alternating current to direct current prior to being supplied to the controllable regulator.

13. The power supply of claim 4, wherein the controllable regulator is configured to linearly decrease power requested from the power supply input after the end of a required increase of power to fulfill transmission requirements, and further wherein the active filter is configured to linearly decrease the amount of power diverted thereto in response to such linear decrease of requested power by the controllable regulator.

14. The power supply of claim 4, wherein the controllable regulator is configured to non-linearly decrease power requested from the power supply input after the end of a required increase of power to fulfill transmission requirements, and further wherein the active filter is configured to non-linearly decrease the amount of power diverted thereto in response to such linear decrease of requested power by the controllable regulator.

15. A method of filtering very low frequency electromagnetic emissions from a radio power supply, the method comprising:

determining when a change in a power level will be required by the radio;

when the required power is to be increased, increasing power drawn by the power supply prior to the required power level change using a controllable regulator in response to a first control signal from a controller, wherein the power is required to be increased at a first rate of change, wherein the power drawn by the power supply is gradually increased such that a second rate of change of power drawn by the power supply in response to the required increase in power is lower than the first rate of change of power at which the power is required to be increased;

when the required power is to be decreased, decreasing power drawn by the power supply after the required power level change, wherein the power is required to be decreased at a third rate of change, wherein the power drawn by the power supply is gradually decreased such that a fourth rate of change of power drawn by the power supply in response to the required decrease in power is lower than the third rate of change of power at which the power is required to be decreased; and diverting, to a gated shunt regulator, any power drawn by the power supply in excess of what is required by the radio in response to a second control signal from the controller, so that the radio is supplied only the required power level, wherein the active filter comprises power storage components that store power diverted to the active filter, wherein the active filter is controlled to release stored power to the power supply output to assist in fulfilling transmission requirements of the radio.

16. The method of claim 15, further comprising:

varying power drawn by the power supply when a magnitude of a rate of change of the power level required by the radio exceeds a predetermined level.

17. The method of claim 15, further comprising:

linearly increasing, to the required power level, the power drawn by the power supply before the change in the required power level; and linearly increasing the power diverted to the gated shunt regulator before the change in the required power level.

18. The method of claim 15, further comprising:

non-linearly increasing, to the required power level, the power drawn by the power supply before the change in the required power level; and non-linearly increasing the power diverted to the gated shunt regulator before the change in the required power level.

19. The method of claim 18, wherein the non-linear increase is sinusoidal.

20. The method of claim 18, wherein the non-linear increase is exponential.

* * * * *